Feb. 13, 1934.     C. F. MÉNDEZ     1,947,161
PROCESS OF AND APPARATUS FOR PRODUCING STEREOSCOPIC MOTION PICTURES
Original Filed July 8, 1930
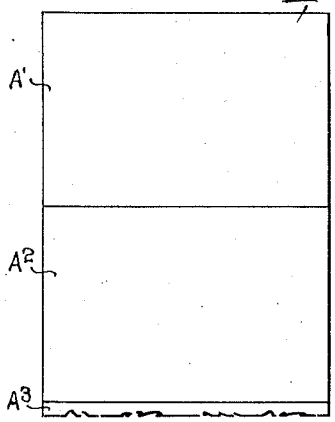
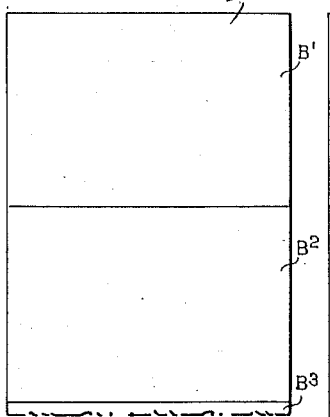
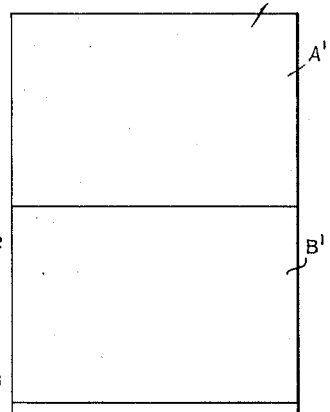
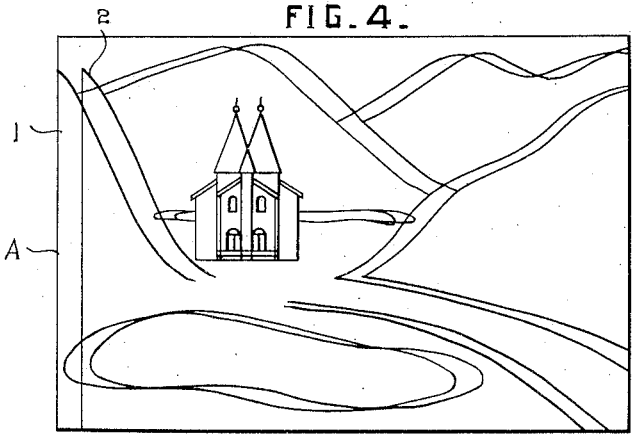
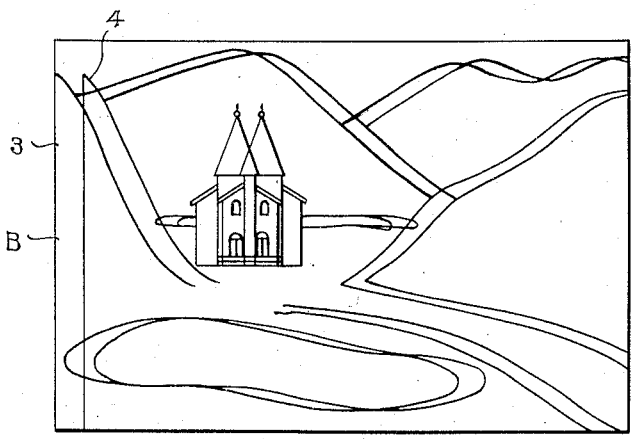
Inventor
CIRO FIDEL MÉNDEZ
By Ogle R. Singleton
Attorney Patented Feb. 13, 1934

1,947,161

UNITED STATES PATENT OFFICE 1,947,161

PROCESS OF AND APPARATUS FOR PRODUCING STEREOSCOPIC MOTION PICTURES

Ciro Fidel Méndez, New York, N. Y.

Refiled for abandoned application Serial No. 466,564, July 8, 1930. This application April 13, 1933. Serial No. 666,050

3 Claims. (Cl. 88—16.6)

My invention consists in a new and useful improvement in the process of and apparatus for producing stereoscopic motion pictures. The particular advantage of my invention is the projection upon a screen of moving pictures in which objects appear in three dimensions to the observer by his natural vision, without the aid of any colored screens as used in former processes.

The process which I have invented to make possible such projection is as follows:

Two moving picture cameras are so related as to produce stereoscopic pictures of the desired scene, and by these I produce simultaneously two films. I thus secure right and left perspective views. Then, by the well-known process, I produce a single film A, on which the two perspective views are superposed, the right perspective being printed in greenish-blue and the left perspective being printed in orange-red. I then produce a second film B, on which the perspective views are superposed, the right perspective being printed in orange-red and the left perspective being printed in greenish-blue.

Thus far, my process is that practiced to produce a film which when viewed through the proper colored screens produces a stereoscopic effect.

The next step in my improved process is to produce a single film C, formed by alternating the successive exposures of the films A and B. Thus I produce a film in which the same perspective view of each exposure is duplicated in complementary colored prints. I have, therefore, on the film C four images for each exposure, arranged in two pairs.

It is to be understood that my film C is moved by the projector at a speed twice that of the usual form of motion picture film so that each pair of double images is presented to the observer in the same time interval that a single image is presented in the usual form of projection. The effect of this projection of my improved film C is that the complementary colors produce the stereoscopic view, by the operation of the well-known law of optics.

In the drawing filed herewith, I have illustrated my improved films by which my improved process may be practiced, but it is to be distinctly understood that I do not consider my invention limited to said illustration but refer for its scope to the claims appended hereto.

In the drawing:

Fig. 1 is a portion of the preliminary film A.
Fig. 2 is a portion of the preliminary film B.
Fig. 3 is a portion of the completed film C.
Fig. 4 is an enlarged single exposure from the film A.
Fig. 5 is an enlarged single exposure from the film B.

In the film A, the images 1 of each exposure are printed in orange-red, and the images 2 of each exposure are printed in greenish-blue. In the film B, the images 3 of each exposure are printed in greenish-blue and the images 4 of each exposure are printed in orange-red.

The completed film C is produced by alternating the exposures of the films A and B. As illustrated in the drawing (Fig. 3) the film C is composed of exposures $A^1$, $B^1$, $A^2$, $B^2$, etc. Thus it is obvious that when the film C is projected as described, the exposure $A^1$ presents the image 1 and the image 2 to the eyes of the observer, the impression of which is retained by the retinas of the eyes until the exposure $B^1$ presents the images 3 and 4, when the physical phenomenon occurs as follows: The apparently superposed images 1 and 3 being printed in complementary colors present a black and white image precisely corresponding with the left perspective view recorded by one of the cameras, and the apparently superposed images 2 and 4 being printed in complementary colors present a black and white image precisely corresponding with the right perspective view recorded by the other camera. These two perspective views, being presented simultaneously, produce the stereoscopic effect, so that the objects appear in three dimensions. The effect of my process is to supply motion pictures with the appearance of depth.

Having described my invention, what I claim is:

1. The process of producing stereoscopic motion pictures which consists in producing simultaneously two stereoscopic images, each image being in a color complementary to the color of the other image; and then producing simultaneously two stereoscopic images identical in form with said first two images and in reversely complementary colors to the colors of the said first two images, and repeating the above described steps for successive duplicate pairs of images delineating the moving object.

2. The process of producing stereoscopic motion pictures which consists in producing simultaneously two stereoscopic motion picture films, one consisting of right perspective images, and the other consisting of left perspective images, producing a preliminary film composed of superposed right and left perspective images, the two sets being printed in complementary colors, producing a second preliminary film composed of superposed right and left perspective images, the two sets being printed in reversely complementary colors to the colors of the two sets of images in the first preliminary film, and producing a completed film by alternating the pairs of perspective images from the two preliminary films, and projecting the completed film at a rate of speed equal to twice the rate of speed of projection of the ordinary motion picture film.

3. A motion picture film in which each exposure comprises two superposed stereoscopic images in complementary colors, the two exposures being arranged in pairs, each pair being identical in form and having their complementary colors reversely arranged.

CIRO FIDEL MÉNDEZ.